(12) United States Patent
Andric et al.

(10) Patent No.: US 7,321,331 B2
(45) Date of Patent: Jan. 22, 2008

(54) METHOD AND APPARATUS FOR TRANSMITTING LOCATION DATA WITHIN AN AD-HOC COMMUNICATION SYSTEM

(75) Inventors: Oleg Andric, West Palm Beach, FL (US); Vernon A. Allen, Fort Lauderdale, FL (US); Minh T. Pham, Boynton Beach, FL (US); Kenneth D. Cornett, Coral Springs, FL (US); Spyros Kyperountas, Coral Springs, IL (US)

(73) Assignee: Motorola, Inc., Schaumburg, IL (US)

( * ) Notice: Subject to any disclaimer, the term of this patent is extended or adjusted under 35 U.S.C. 154(b) by 680 days.

(21) Appl. No.: 10/787,987

(22) Filed: Feb. 26, 2004

(65) Prior Publication Data

US 2005/0192748 A1 Sep. 1, 2005

(51) Int. Cl.
*G01S 1/00* (2006.01)
(52) U.S. Cl. .................... 342/386; 342/357.09
(58) Field of Classification Search ........... 342/357.02, 342/357.09, 386, 450, 457, 463; 701/300
See application file for complete search history.

(56) References Cited

U.S. PATENT DOCUMENTS

| | | | | |
|---|---|---|---|---|
| 6,078,818 | A * | 6/2000 | Kingdon et al. | 455/456.5 |
| 6,462,706 | B2 * | 10/2002 | Decker | 342/357.02 |
| 2002/0090957 | A1 * | 7/2002 | Harris | 455/456 |
| 2004/0230374 | A1 * | 11/2004 | Tzamaloukas | 701/217 |
| 2005/0136972 | A1 * | 6/2005 | Smith et al. | 455/554.1 |
| 2005/0277426 | A1 * | 12/2005 | Evans et al. | 455/456.1 |
| 2006/0158329 | A1 * | 7/2006 | Burkley et al. | 340/539.13 |

* cited by examiner

Primary Examiner—Dao Phan

(57) ABSTRACT

To reduce interference and increase battery life, a method and apparatus for transmitting location data within an ad-hoc communication system is provided herein. During operation, a portion of a beacon payload is reserved to broadcast location information (coordinates) for a node as well as other parameters that may be needed for location estimation. In addition to a node's location, an accuracy of the nodes location is also included within the beacon field. Because nodes will no longer have to awake outside their beacon transmit times to broadcast location information, battery life is extended. In addition, because nodes will no longer be transmitting location information outside their guaranteed time slot, system interference is also reduced.

6 Claims, 3 Drawing Sheets

METHOD AND APPARATUS FOR TRANSMITTING LOCATION DATA WITHIN AN AD-HOC COMMUNICATION SYSTEM

FIELD OF THE INVENTION

The present invention relates generally to ad-hoc communication systems and in particular, to a method and apparatus for transmitting location data within an ad-hoc communication system.

BACKGROUND OF THE INVENTION

In many wireless communication systems, a node within the system will need to determine, and broadcast location information. Because of this, there exists many prior-art schemes to determine locations for nodes within communication systems, and then broadcast the locations to other nodes within the system. For example, in U.S. Pat. Ser. No. 10/040,610 location calculations are done at a central location or at the nodes in the network in a distributed manner. As the location algorithm is distributed throughout the network it is necessary for the individual nodes to know the location of neighbors within communication range. In general this requires added communication between nodes in the network to exchange calculated position estimates.

As is known, excessive transmission by nodes within a communication system not only contributes to overall system interference, but also reduces battery life for the transmitting nodes. Thus, the constant transmission of location estimates by nodes within a communication system increases system interference and decreases the battery life for the nodes transmitting such information. Therefore, a need exists for a method and apparatus for transmitting location data within a communication system that reduces the amount of system interference, while minimizing the amount of battery drain on the node.

DETAILED DESCRIPTION OF THE DRAWINGS

To address the above-mentioned need, a method and apparatus for transmitting location data within an ad-hoc communication system is provided herein. During operation, a portion of a beacon payload is reserved to broadcast location information for a node as well as other parameters that may be needed for location estimation. In addition to a node's location, an accuracy of the nodes location is also included within the beacon field. Because nodes will no longer have to awake outside their beacon transmit times to broadcast location information, battery life is extended. In addition, because nodes will no longer be transmitting location information outside their guaranteed time slot, system interference is also reduced.

The present invention encompasses a method for transmitting location data. The method comprises the steps of determining a location, determining an accuracy of the location, and determining when a beacon transmission will take place. Finally, the location and the accuracy of the location are transmitted within the beacon.

The present invention additionally encompasses a method for transmitting location data. The method comprises the steps of determining a location for a first node within an ad-hoc communication system, determining an accuracy of the location for the first node, and determining when the first node will be transmitting a beacon. The location and the accuracy of the location are then transmitted within the beacon.

Finally, the present invention encompasses an apparatus comprising location-finding equipment outputting a location and the location's accuracy for a node in an ad-hoc communication system. The apparatus additionally encompasses logic circuitry determining when a beacon transmission will take place and a transceiver utilized to transmit the beacon. Both the location and the accuracy of the location are contained within the beacon.

Figure 1:
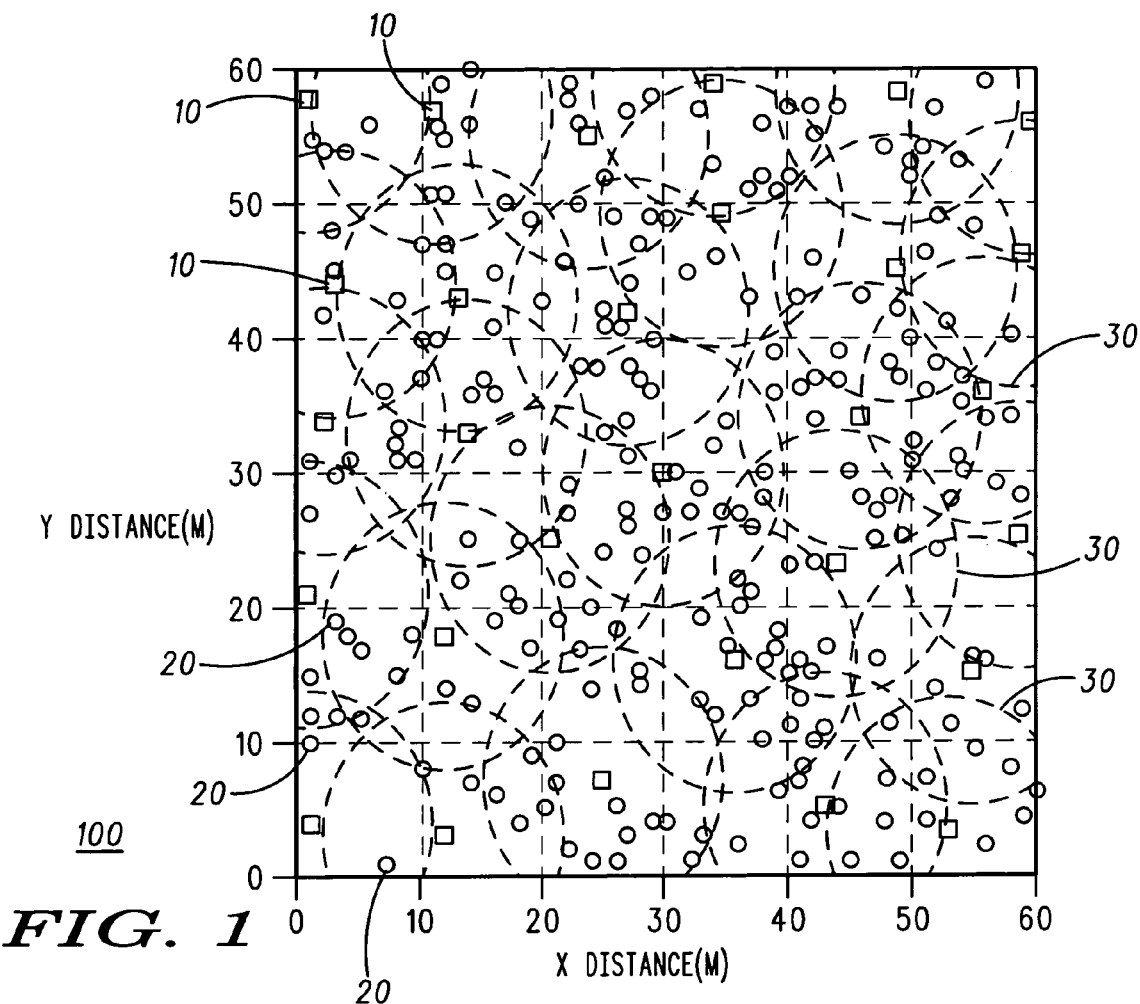
FIG. 1 is a block diagram of a communication system.

Turning now to the drawings, wherein like numerals designate like components, FIG. 1 illustrates communication system 100 in accordance with the preferred embodiment of the present invention. Communication system 100 preferably utilizes a communication system protocol defined by 802.15.3 Wireless Personal Area Networks for High Data Rates or IEEE 802.15.4 Low Rate Wireless Personal Area Networks. However one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc. As shown, communication system 100 includes a number of piconets, each comprising a coordinating device 10 and a larger number of slave nodes 20 in communication with coordinating device 10. Nodes 20 represent devices that communicate with each other through synchronization provided by coordinating devices 10. Nodes 20 can be transportable (mobile) or they can be fixed in a given place.

Figure 2:
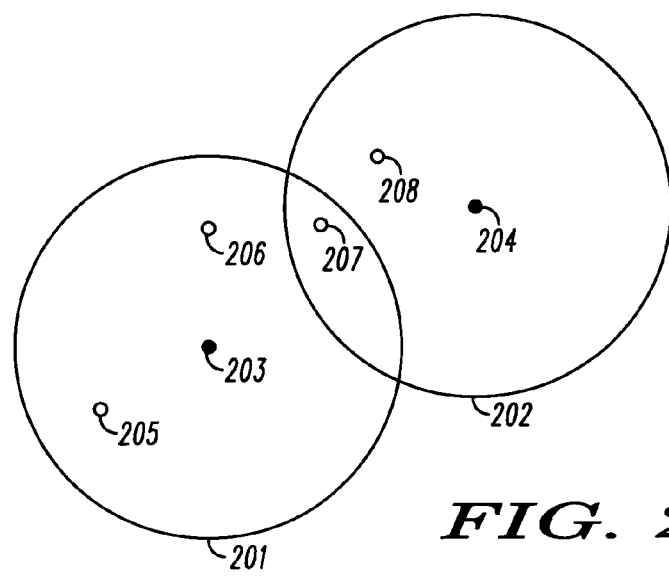
FIG. 2 is a more-detailed block diagram of the communication system of FIG. 1.
Figure 3:
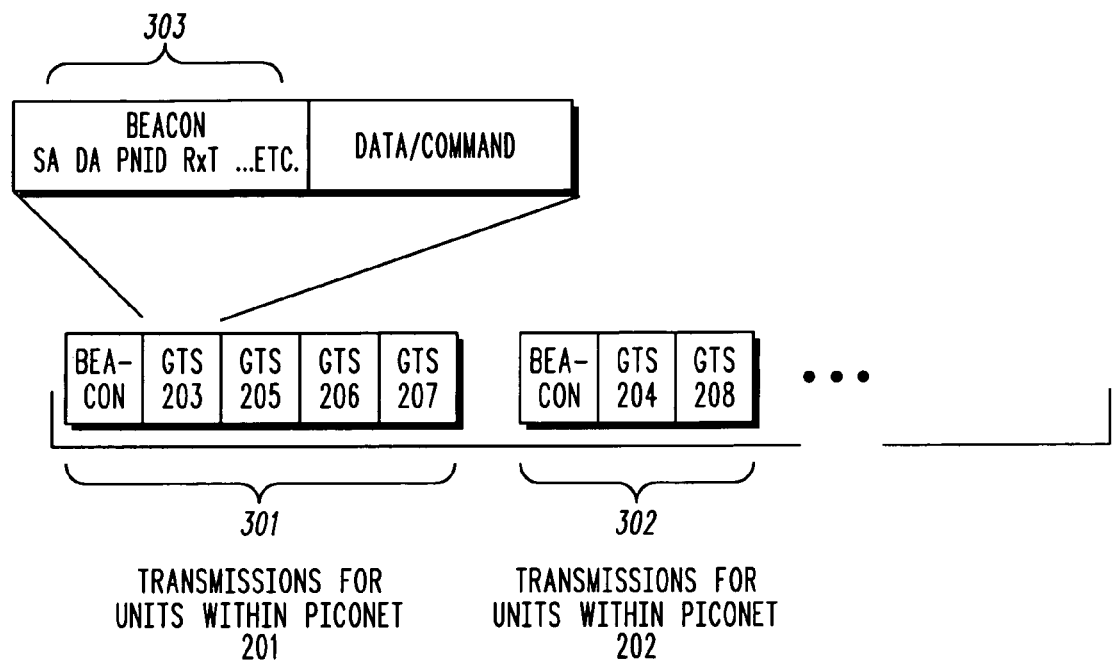
FIG. 3 illustrates a transmission scheme for the communication system of FIG. 1.

Prior to describing techniques for determining a node's location, and then broadcasting the location to other nodes, it is necessary to set forth background information with reference to FIG. 2 and FIG. 3. In particular, FIG. 2 is a more-detailed view of system 100, showing two piconets 201 and 202 having respective controllers 203 and 204. In this illustration, nodes 205-207 are associated with controller 203 (piconet 201), while node 208 is associated with controller 204 (piconet 202).

FIG. 3 illustrates a transmission scheme for the communication system of FIG. 2. During communications among devices 201-208, a specific transmission protocol is utilized by communication system 100 wherein each piconet communicates within a particular non-overlapping superframe 301, 302 as described in U.S. patent application Ser. No. 10/414,838, which is incorporated by reference herein. With reference to FIG. 2, piconet 201 completes all necessary transmissions within superframe 301, while piconet 202 completes all necessary transmissions within superframe 302. During a superframe, a particular controller of the piconets will broadcast piconet timing and control information within a beacon field, while each node (including the controller) will have a Contention Free Period slot, part of the Channel Time Allocation (CTA) facility of the IEEE 802.15.3 standard, for transmission. During its guaranteed time slot, a particular node broadcasts any command (COM) wishing to be executed to any particular node or may send data intended for a single node or set of nodes.

During the time slot, the node also broadcasts a beacon comprising identification of the piconet(s) a node is associated with (i.e., a piconet identifier (PNID)), along with a source address (SA, or device identifier (DEVID)), a destination address (device identifier (DA or DEVID)), and a receive time (RxT) when the node can receive other node's transmissions. This is illustrated in FIG. 3 with the expanded view of the GTS for node 205. It should be noted that although FIG. 3 shows the beacon signal comprising SA, DA, PNID, and RxT, one of ordinary skill in the art will recognize that the beacon signal may comprise other elements such as, but not limited to, the byte length of the frame being used, a beacon payload that can be used to broadcast generic data . . . etc.

In ad-hoc wireless networks it is often advantageous to allow devices to sleep for extended periods to increase battery life. Therefore, when a node has no data to transmit, or does not wish to listen to other node's transmissions, the node will enter a sleep mode, powering down its transceiver. The node will awake when it is time for the node to again transmit its beacon signal. As discussed above, prior-art techniques for transmitting location data required nodes to awake outside their beacon time period in order to transmit the location data. This increased system interference as well as decreased battery life for the node. In order to address this issue, a portion of the beacon payload is reserved to broadcast location information (coordinates) for a node as well as other parameters that may be needed for location estimation (estimated channel parameters, node location confidence etc.).

Figure 4:
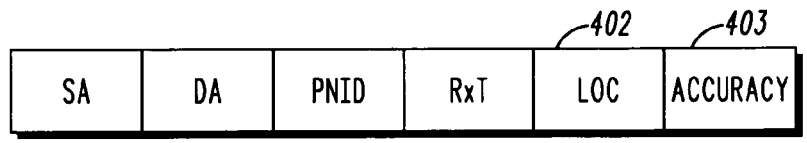
FIG. 4 illustrates a beacon transmission.

FIG. 4 illustrates beacon 401 that incorporates location information. As is evident, beacon 401 includes SA, DA, PNID, and RxT. Beacon 401 additionally includes node's location (LOC) 402 as well as an accuracy of the nodes location 403. Because nodes may obtain their locations by determining their distance from nodes with "known", or highly accurate locations, it is advantageous for a node to know which location measurements 402 where known, and which were derived. This information is included within accuracy field 403. Thus, for many location algorithms to give meaningful information to a user some of the devices in the network must have predetermined locations, i.e. they must be placed in a known location or have an independent means of determining their absolute position, such as by using GPS (global positioning system). In communication system 100 these devices will include their location information (e.g. x,y,z coordinates) in their beacon transmissions, along with information that identifies them as knowing or not knowing their absolute position. In other words, the beacon will comprise information on whether the location information is known or estimated, and alternatively, may comprise an error in the location estimate.

Other nodes in range will receive the beacon signals and store the location information for the transmitting node. This data will be applied in the distributed location algorithm so that the unit can determine its' own location using distance estimates from one or more received beacons which contain position estimates. Once a node's own position has been satisfactorily determined, the unit will add this location information to its own beacon, along with an indication of the location's accuracy. The process will be iterative, because as new nodes enter the network and calculate their own locations with an augmented set of range information, previously present nodes can refine their position estimate using the new information.

Figure 5:
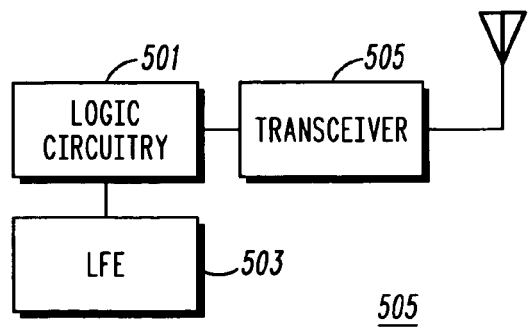
FIG. 5 is a block diagram of a node within the communication system of FIG. 1.

FIG. 5 is a block diagram of node 500. As is evident, node 500 comprises logic circuitry 501, location-finding equipment (LFE) 503, and transceiver 505. During operation logic circuitry 501 instructs LFE 503 to acquire a current location. As discussed above, this location may be obtained by one of several existing techniques. For example, LFE 503 may comprise a GPS receiver that accurately obtains the node's location. Alternatively, LFE 503 may simply be circuitry designed to calculate a location based on a Time-Difference of Arrival (TDOA) technique by analyzing propagation delays from nodes with accurate, or known, locations.

Regardless of the technique used to determine the location of node 500, once the location is known, LFE 503 passes this information to logic circuitry 501, where it is placed within a beacon, passed to transceiver 505, and transmitted as described above. Additionally, as described above, logic circuitry 501 additionally places an accuracy field within the beacon so that other nodes can determine the accuracy of the location estimate. The accuracy field may simply comprise a binary 0 or 1 indicating a "know" or derived location, or may comprise other indications of accuracy, such as, but not limited to an error calculation of the location, a standard deviation of the location, . . . , etc.

Because nodes within communication system 100 will no longer have to awake outside their beacon transmit times to broadcast location information, battery life is extended. In addition, because nodes will no longer be transmitting location information outside their guaranteed time slot, system interference is also reduced.

Figure 6:
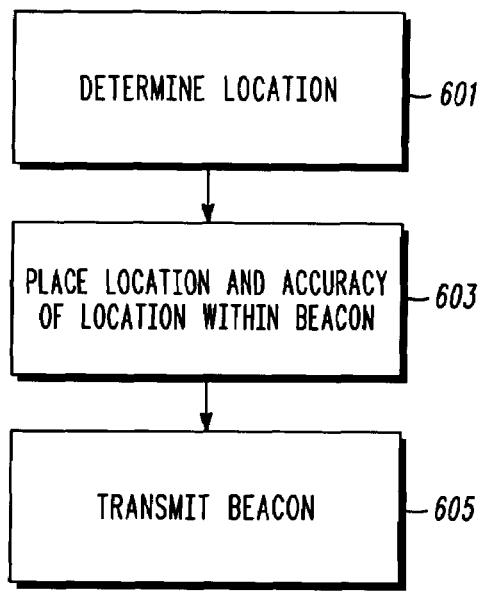
FIG. 6 is a flow chart showing operation of the node of FIG. 5.

FIG. 6 is a flow chart showing operation of the node of FIG. 5. The logic flow begins at step 601 where LFE 503 determines a location estimate and the accuracy of the location estimate for the node's location. This location estimate is passed to logic circuitry 501 where logic circuitry 501 determines when the beacon transmission will take place and places the location estimate along with its accuracy into a beacon transmission (step 603). Logic circuitry 501 passes the beacon to transceiver 505 where it is transmitted (step 605).

As discussed above, in many location techniques, a node will have to obtain location estimates and accuracy information from other nodes in order to determine its location. For this to happen, the node must receive location/accuracy data by analyzing a beacon transmission. Thus, for a first node to determine a second node's location/accuracy, the first node must awake during the second node's beacon transmission. In order to accomplish this, the first node must be made aware of when the second node will be transmitting its beacon. This could be accomplished in many different ways, one of which is by looking up the timing of the second node's beacon in the neighbors list that was created by listening to the channel for at least a superframe. Another way is to listen to the channel for the whole superframe and hear all of the neighboring nodes' beacons with their location and accuracy information. Yet another way is for the beacon timing to be predetermined. Regardless of how the first node becomes aware of the second node's beacon transmissions, the first node awakes and listens for the second node's beacon to obtain location/accuracy information. Once the location and accuracy of the second node is determined, the first node can then utilize this information in performing any location estimate.

Figure 7:
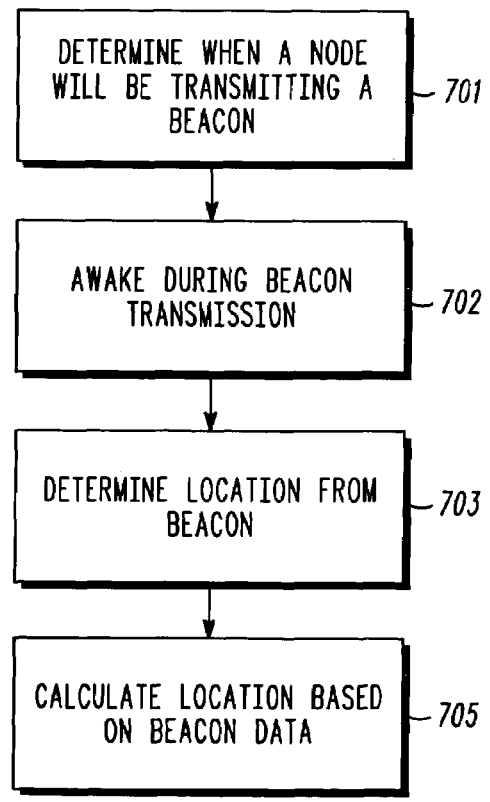
FIG. 7 is a flow chart showing operation of the node of FIG. 5.

FIG. 7 is a flow chart showing operation of a first node wishing to determine a location estimate of a second node. The logic flow begins at step 701 where the first node determines when the second node will be transmitting its beacon. At step 702, the first node awakes during the second node's beacon transmission, and then determines location information from the second node's beacon transmission (step 703). Finally, at step 705, the first node utilizes the location information (e.g., location and accuracy) from the beacon, and calculates a location for the first node.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for transmitting location data, the method comprising the steps of:
    determining a location for a first node within an ad-hoc communication system;
    determining an accuracy of the location for the first node;
    determining when the first node will be transmitting a beacon;
    transmitting the location and the accuracy of the location within the beacon;
    determining by a second node when the first node will be transmitting the beacon;
    receiving the beacon by the second node; and
    determining the location of the first node based on the received beacon.

2. The method of claim 1 further comprising the step of:
    determining the accuracy of the location based on the received beacon.

3. The method of claim 1 wherein the beacon comprises an IEEE 802.15.3 or an IEEE 802.15.4 ad-hoc network beacon.

4. The method of claim 1 wherein the accuracy of the location comprises whether or not the location is an absolute or an estimated location.

5. The method of claim 1 wherein the accuracy of the location comprises an error in the location.

6. The method of claim 1 wherein the accuracy of the location comprises a binary 0 or 1 indicating a known or derived location.

* * * * *